United States Patent
Ishii et al.

(10) Patent No.: US 8,249,634 B2
(45) Date of Patent: Aug. 21, 2012

(54) BASE STATION APPARATUS AND COMMUNICATIONS CONTROL METHOD

(75) Inventors: Hiroyuki Ishii, Yokosuka (JP); Kenichi Higuchi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 573 days.

(21) Appl. No.: 12/522,393

(22) PCT Filed: Dec. 12, 2007

(86) PCT No.: PCT/JP2007/073979
§ 371 (c)(1),
(2), (4) Date: Aug. 13, 2009

(87) PCT Pub. No.: WO2008/084623
PCT Pub. Date: Jul. 17, 2008

(65) Prior Publication Data
US 2010/0113080 A1    May 6, 2010

(30) Foreign Application Priority Data

Jan. 12, 2007  (JP) .................................. 2007-005196

(51) Int. Cl.
*H04B 7/00*     (2006.01)
*H04B 1/00*     (2006.01)
(52) U.S. Cl. ........... 455/509; 455/522; 455/69; 455/513
(58) Field of Classification Search .................. 455/522, 455/69, 509, 513
See application file for complete search history.

(56) References Cited

U.S. PATENT DOCUMENTS

| | | | |
|---|---|---|---|
| 6,950,419 B1 * | 9/2005 | Park et al. ..................... 370/338 |
| 8,072,938 B2 * | 12/2011 | Lee et al. ....................... 370/331 |
| 8,126,495 B2 * | 2/2012 | Wu et al. ........................ 455/522 |
| 2007/0291702 A1 | 12/2007 | Nanba et al. |
| 2008/0304582 A1 | 12/2008 | Miyoshi et al. |
| 2009/0161611 A1 * | 6/2009 | Kuroda .......................... 370/329 |
| 2009/0185577 A1 | 7/2009 | Kishiyama et al. |
| 2009/0238152 A1 * | 9/2009 | Hans et al. ..................... 370/335 |
| 2009/0262690 A1 * | 10/2009 | Breuer et al. .................. 370/329 |
| 2010/0099429 A1 * | 4/2010 | Ishii et al. .................. 455/452.1 |
| 2010/0111008 A1 * | 5/2010 | Ishii .............................. 370/329 |
| 2011/0216849 A1 | 9/2011 | Kishiyama et al. |

(Continued)

FOREIGN PATENT DOCUMENTS

EP    1 879 306 A1    1/2008

(Continued)

OTHER PUBLICATIONS

International Search Report w/translation from PCT/JP2007/073979 dated Mar. 25, 2008 (4 pages).

(Continued)

*Primary Examiner* — Tilahun B Gesesse
(74) *Attorney, Agent, or Firm* — Osha Liang LLP

(57) ABSTRACT

A base station apparatus for carrying out communications with a mobile station in downlink using an OFDM method is disclosed. The base station apparatus is characterized in that the base station apparatus transmits a first signal and a second signal; a predetermined transmission power of the second signal is set; and the base station apparatus comprises a first transmission power controlling section that controls so that a transmission power per unit frequency band of the first signal is constant; and a frequency resource assignment section that determines a frequency resource to be assigned to the first signal, in accordance with the transmission power of the second signal and the transmission power per unit frequency band of the first signal.

16 Claims, 10 Drawing Sheets

U.S. PATENT DOCUMENTS

2012/0082261 A1    4/2012    Kishiyama et al.

FOREIGN PATENT DOCUMENTS

| JP | 2006-217415 | A  | 8/2006  |
| JP | 2006-237897 | A  | 9/2006  |
| JP | 2006-345363 | A  | 12/2006 |
| WO | 2006/003761 | A1 | 1/2006  |
| WO | 2006/043588 | A1 | 4/2006  |
| WO | 2006/112133 | A1 | 10/2006 |
| WO | 2006109436  | A1 | 10/2006 |
| WO | 2006-126616 | A1 | 11/2006 |

OTHER PUBLICATIONS

Written Opinion from PCT/JP2007/073979 dated Mar. 25, 2008 (3 pages).

Patent Abstracts of Japan; Publication No. 2006-345363 dated Dec. 21, 2006; NTT DoCoMo Inc., NEC Corp., Fujitsu Ltd. (1 page).

Patent Abstracts of Japan; Publication No. 2006-217415 dated Aug. 17, 2006; Sharp Corp. (1 page).

3GPP TR 25.814 V7.0.0; "3rd Generation Partnership Project; Technical Specification Group Radio Access Network; Physical Layer Aspects for Evolved Universal Terrestrial Radio Access (UTRA)"; Jun. 2006 (126 pages).

3GPP TSG RAN WG1 Meeting #47bis; R1-070098 (w/translation); "Persistent Scheduling in E-UTRA"; Sorrento, Italy; Jan. 15-19, 2007 (7 pages).

3GPP TSG RAN WG1 Meeting #47bis; R1-070088 (w/translation); "Power Boosting of Reference Signal in E-UTRA Downlink"; Sorrento, Italy; Jan. 15-19, 2007 (7 pages).

Japanese Office Action for Application No. 2008-553034, mailed on May 15, 2012 (3 pages).

Patent Abstracts of Japan for Japanese Publication No. 2006-237897, publication date Sep. 07, 2006 (1 page).

English abstract for WO 2006/109436, publication date Oct. 19, 2006, esp@cenet database, (1 page).

\* cited by examiner

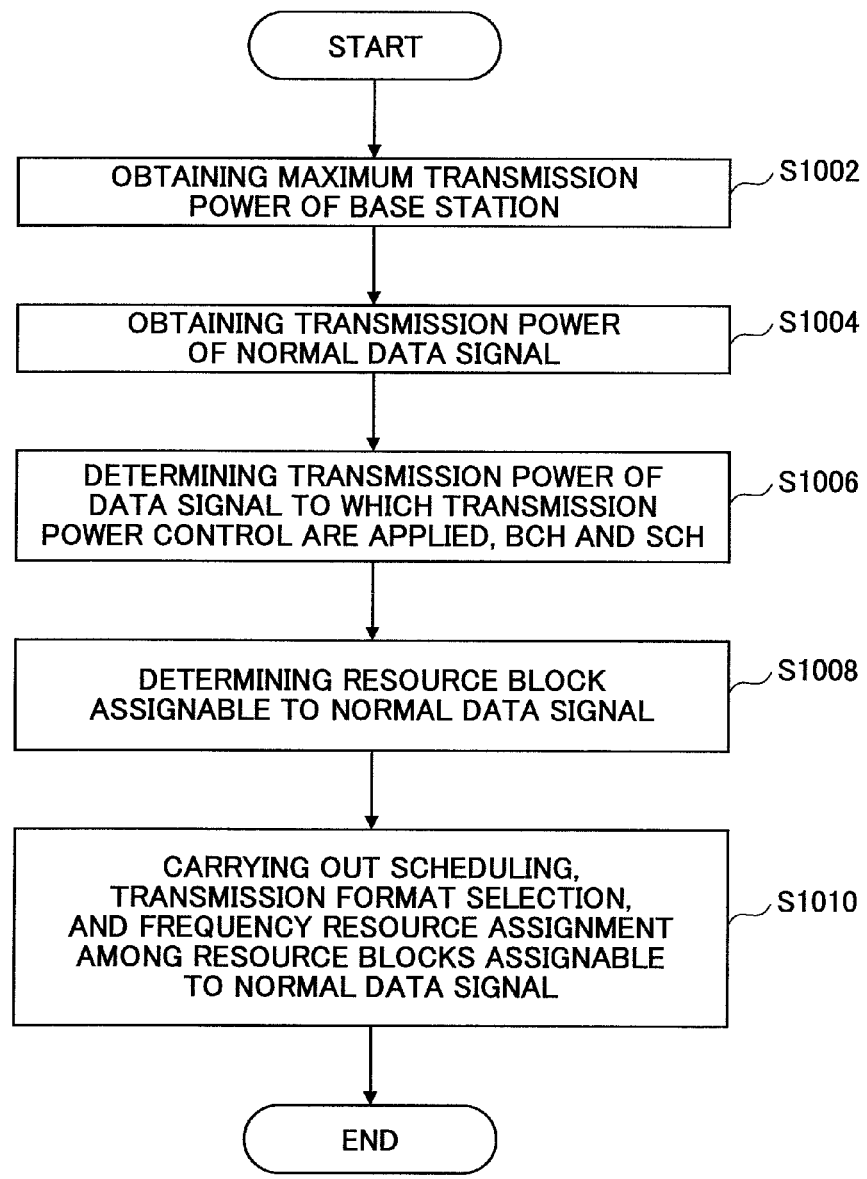

BASE STATION APPARATUS AND COMMUNICATIONS CONTROL METHOD

TECHNICAL FIELD

The present invention relates to a mobile communications system where Orthogonal Frequency Division Multiplexing is employed in downlink, and specifically to a base station apparatus and a communications control method.

BACKGROUND ART

A communications method as a successor of W-CDMA and HSDPA, namely, Long Term Evolution (LTE) has been considered by a W-CDMA standardization organization 3GPP. As a radio access method, Orthogonal Frequency Division Multiplexing (OFDM) is under consideration for downlink, and Single-Carrier Frequency Division Multiple Access (SC-FDMA) is under consideration for uplink (see Non-patent Publication 1, for example).

In OFDM, a frequency band is divided into plural narrow frequency bands (sub-carriers), and data are placed on the respective divided frequency bands to carry out transmission. The sub-carriers are densely arranged in a frequency direction, allowing the sub-carriers to be partly overlapped without causing interference, thereby realizing high speed transmission and improving frequency usage efficiency.

In SC-FDMA, a frequency band is divided into plural narrow bands, and different narrow bands are used by different terminal devices, so that interference between the user terminals can be reduced. According to SC-FDMA, which is characterized in that variations in the transmission electric power are reduced, a large coverage area and low energy consumption can be realized.

Generally, fluctuations in a propagation environment such as fading take place in mobile communications. Due to fading, transmission quality, namely, a bit error rate characteristic is greatly degraded. In a third generation mobile communications system such as International Mobile Telecommunication-200 (IMT-2000), transmission power control that changes transmission power depending the fluctuations in the propagation environment is applied as a technique for reducing degradation of the transmission quality due to fading.

On the other hand, in LTE, an Adaptive Modulation and Coding (AMC) that changes a frequency bandwidth, a modulation scheme, a coding rate, and a data size depending on the fluctuations in the propagation environment is applied as a technique for reducing degradation of the transmission quality due to fading. Therefore, the transmission power per unit frequency band for a data signal in LTE, namely, the transmission power per sub-carrier is constant. In the following, the data signal to which the AMC is applied is referred to as a "normal data signal".

However, application of the transmission power control is under consideration even in LTE for a data signal such as Voice over Internet Protocol (VoIP) and the like, which is transmitted at about a constant transmission rate (see Non-patent Publication 2, for example). In LTE, a transmission method for transmitting the data signal such as VoIP and the like, which is transmitted at about a constant transmission rate, is called persistent scheduling or semi-persistent scheduling.

In addition, it is being considered that a ratio of a transmission power per sub-carrier of a Downlink Reference Signal, which is a pilot signal, and a transmission power per one sub-carrier of a normal signal be set to a fixed value, and a mobile station use the fixed value to carry out demodulation of an orthogonal amplitude modulation, such as a 16 Quadrature Amplitude Modulation (QAM) or 64 QAM modulation (see Non-patent Publication 3, for example).

In the demodulation of 16 QAM or 64 QAM, because amplitude estimation has to be carried out, the transmission characteristic can be improved by carrying out demodulation using the above fixed value. In this case, because the transmission power per sub-carrier of the Downlink Reference Signal is always constant, the transmission power per sub-carrier of the normal data signal is also always constant.

When there are a time period when the Downlink Reference Signal is transmitted and a time period when the Downlink Reference Signal is not transmitted, as a method to make the transmission power per sub-carrier of the normal data signal even in both time periods, it is considered that mapping of the normal data signal to a predetermined sub-carrier be prohibited in the time period when the Downlink Reference Signal is transmitted (see Non-Patent Document 3). Information on which sub-carrier is subject to the prohibition of the normal data signal mapping has to be system-specific. It is considered that the sub-carrier for which mapping of the normal data signal is prohibited be associated with the ratio (a fixed value) of the transmission power per sub-carrier of the Downlink Reference Signal and the transmission power per sub-carrier of the normal data signal.

In the method where the mapping of the normal data signal to the predetermined sub-carrier is prohibited, it is presupposed that a base station apparatus transmits at the maximum transmission power (rated power). When the base station apparatus cannot transmit at the maximum transmission power (rated power), the transmission efficiency is reduced because all the transmission power resources are not used up.

Non-patent Publication 1: 3GPP TR 25.814 (V7.0.0), "Physical Layer Aspects for Evolved UTRA," June 2006

Non-patent Publication 2: R1-070098, "Persistent Scheduling in E-UTRA,", January 2007

Non-patent Publication 3: R1-070088, "Power Boosting of Reference Signal in E-UTRA Downlink,", January 2007

SUMMARY OF INVENTION

Problems to be Solved by the Invention

However, the background art described above has the following problems.

In LTE, there are channels such as a Synchronization Channel (SCH) used for cell search by a mobile station, a Broadcast Channel (BCH) for transmitting broadcast information, and the like. Because these channels are extremely important when carrying out communications, they may be transmitted at a higher transmission power level compared with the normal data signal. In addition, there are time periods when the SCH and the BCH are transmitted and not transmitted.

Moreover, regarding the data signal transmitted at about a constant transmission rate such as VoIP and the like, the transmission power control rather than the AMC may be applied even in LTE. In this case, the transmission power of the data signal that transmits the VoIP fluctuates in terms of time.

At this time, because the fluctuations in the transmission power of the data signal for transmitting the VoIP are not predictable, the method where the mapping of the normal data signal to the predetermined sub-carrier cannot be applied. In addition, while the fluctuations in the power in the BCH and the SCH may be predictable to some extent, the system becomes be more complex because the information on the sub-carrier for which the mapping of the normal data signal is prohibited has to be defined as the system specific information.

The present invention has been made in view of the above problems, and an objective thereof is to provide a base station apparatus and a communication method that are capable of making constant transmission power per sub-carrier of the normal data signal, and utilizing the transmission power resources of the base station apparatus to a maximum even when high transmission power is set for the channels such as the SCH, the BCH, and the like, and when there is a data signal to which the transmission power control is applied.

Means for Solving the Problem

In order to solve the above problems, there is provided a base station apparatus, according to an embodiment of the present invention, for carrying out communications with a mobile station in downlink using an OFDM method, the base station apparatus being characterized in that: the base station apparatus transmits a first signal and a second signal; a predetermined transmission power of the second signal is set; and the base station apparatus comprises a first transmission power controlling section that controls so that a transmission power per unit frequency band of the first signal is constant; and a frequency resource assignment section that determines a frequency resource to be assigned to the first signal, in accordance with the transmission power of the second signal and the transmission power per unit frequency band of the first signal.

By configuring in such a manner, even when the transmission power of the second signal fluctuates in terms of time, the transmission power per unit frequency band of the first signal can be always constant.

There is provided another base station apparatus, according to an embodiment of the present invention, for carrying out communications with a mobile station in downlink using an OFDM method, the base station apparatus being characterized in that: the base station apparatus transmits a first signal and a second signal; and the base station apparatus comprises a first transmission power controlling section that controls so that a transmission power per unit frequency band of the first signal is constant, a second transmission power controlling section that changes a transmission power of the second signal in terms of time, and a frequency resource assignment section that determines a frequency resource to be assigned to the first signal, in accordance with the transmission power of the second signal and the transmission power per unit frequency band of the first signal.

By configuring in such a manner, even when the transmission power of the second signal fluctuates in terms of time, the transmission power per unit frequency band of the first signal can be always constant.

There is provided a communications control method, according to an embodiment of the present invention, in a base station apparatus for carrying out communications with a mobile station in downlink using an OFDM method, the communications control method being characterized in that: the base station apparatus transmits a first signal and a second signal, and the communications control method comprises a transmission power setting step, wherein a predetermined transmission power of the second signal is set; a first transmission power controlling step, wherein the transmission power per unit frequency band of the first signal is controlled to be constant; and a frequency resource assigning step, wherein the frequency resource to be assigned to the first signal is determined in accordance with the transmission power of the second signal and the transmission power per unit frequency band of the first signal.

By configuring in such a manner, even when the transmission power of the second signal fluctuates in terms of time, the transmission power per unit frequency band of the first signal can be always constant.

Advantage of the Invention

According to an example of the present invention, there are provided a base station apparatus and a communications control method that are capable of making constant transmission power per sub-carrier of the normal data signal, and utilizing transmission power resources of the base station apparatus to a maximum even when there is a channel whose transmission power fluctuates in terms of time.

BRIEF DESCRIPTION OF THE DRAWINGS

FIG. 10 is a flowchart illustrating a communications control method according to one example of the present invention.

LIST OF REFERENCE SYMBOLS

Figure 1:
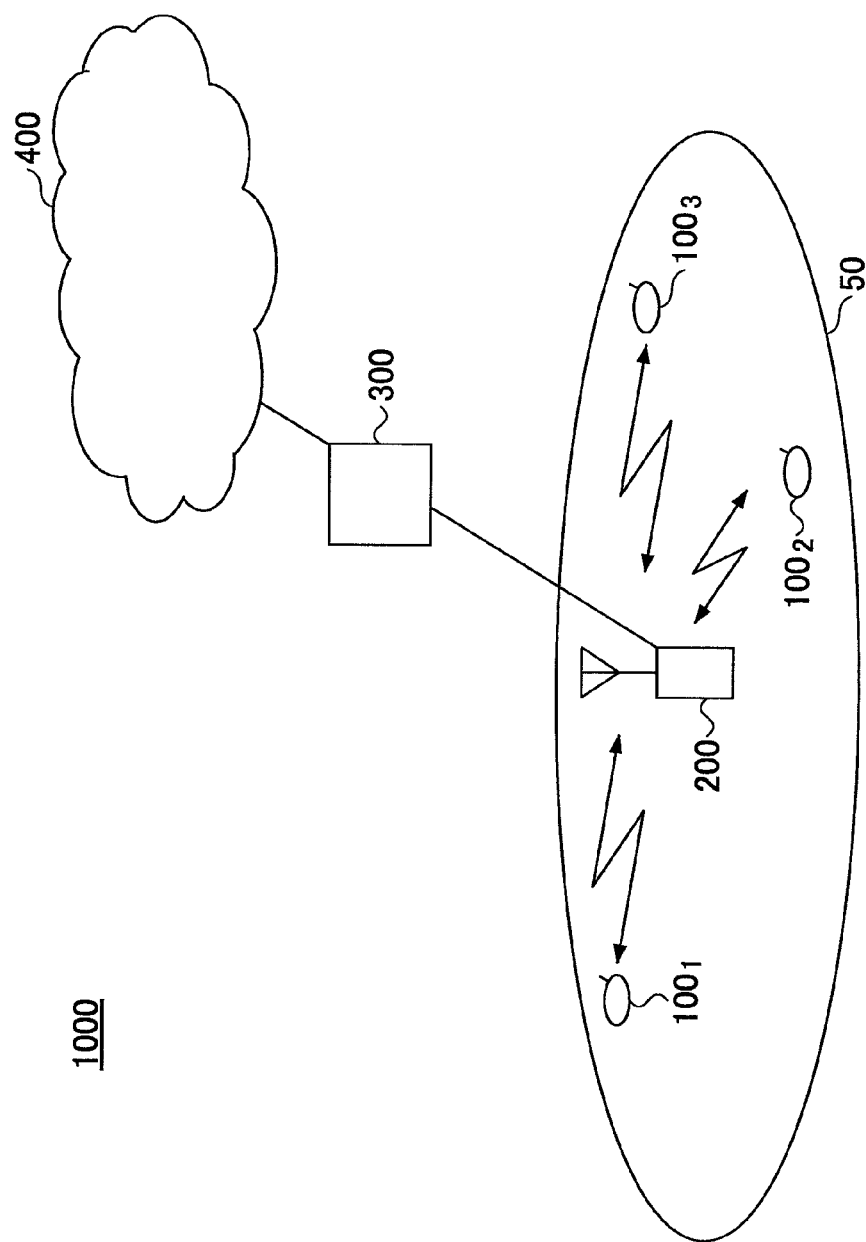
FIG. 1 is a block diagram illustrating a system configuration of a radio communications system according to an example of the present invention.

50: cell
$100_1$, $100_2$, $100_3$, $100_n$: mobile station
200: base station apparatus
202: transmission reception antenna
204: amplification section
206: transmission reception section
208: baseband processing section
210: call processing section
212: transmission path interface
2081: layer 1 processing section
2082 MAC processing section
2083: RLC processing section
2084: DL transmission power determining section
300: access gateway apparatus
400: core network

BEST MODE FOR CARRYING OUT THE INVENTION

Next, preferred embodiments for carrying out the present invention are explained in accordance with the following examples with reference to the drawings.

In all the drawing for explaining the examples, the same reference symbols are used for elements having the same function, and repetitive explanations are omitted.

Referring to FIG. 1, a radio communications system is explained in which a base station apparatus according to an example of the present invention is applied.

A radio communications system 1000, to which Evolved UTRA and UTRAN (another name: Long Term Evolution or Super 3G) is applied, includes a base station apparatus (eNB: eNodeB) 200 and plural mobile station apparatuses (UE: User Equipment) $100_n$ ($100_1$, $100_2$, $100_3$, ..., $100_n$, n: an integer more than zero). The base station apparatus 200 is connected to an upper layer station, for example, an access gateway apparatus 300, and the access gateway apparatus 300 is connected to a core network 400. The mobile station $100_n$ carries out communications with the base station apparatus 200 in a cell 50 under Evolved UTRA and UTRAN.

In the following, the mobile station apparatuses $100_1$, $100_2$, $100_3$, ..., $100_n$ are referred to as the mobile station $100_n$, unless otherwise noted, because they have the same configuration, function, and condition.

The radio communications system 1000 employs Orthogonal Frequency Division Multiplexing (OFDM) for downlink, and Single-Carrier Frequency Division Multiple Access (SC-FDMA) for uplink as radio access methods. As stated above, in OFDM, a frequency band is divided into plural narrow frequency bands (sub-carriers), and data are placed on the respective divided frequency bands to carry out transmission. In SC-FDMA, a frequency band is divided, and different frequency bands are used by different terminal devices to carry out transmission, so that interference between the terminal devices can be reduced.

Communications channels in Evolved UTRA and UTRAN are explained.

In downlink, a Physical Downlink Shared Channel (PDSCH) to be used in a sharing manner by the mobile stations $100_n$ and a downlink control channel for LTE are used. In downlink, transport format information and identification of user, to which PDSCH is transmitted, transport format information and identification of user, to which Physical Uplink Shared Channel (PUSCH) is transmitted, acknowledgement information of the PUSCH and the like are provided through the downlink control channel for LTE, and user data are transmitted through the PDSCH.

In uplink, the PUSCH to be used in a sharing manner by the mobile stations $100_n$ and an uplink control channel for LTE are used. The uplink control channel includes two types, i.e., a channel to be time-multiplexed in the PUSCH and a channel to be frequency-multiplexed in the PUSCH.

In uplink, downlink quality information (Channel Quality Indicator (CQI)) to be used for PDSCH scheduling and Adaptive Modulation Coding (AMC), and acknowledge information (HARQ ACK information) of the PDSCH are transmitted through the uplink control channel for LTE. In addition, user data are transmitted through the PUSCH.

Figure 2:
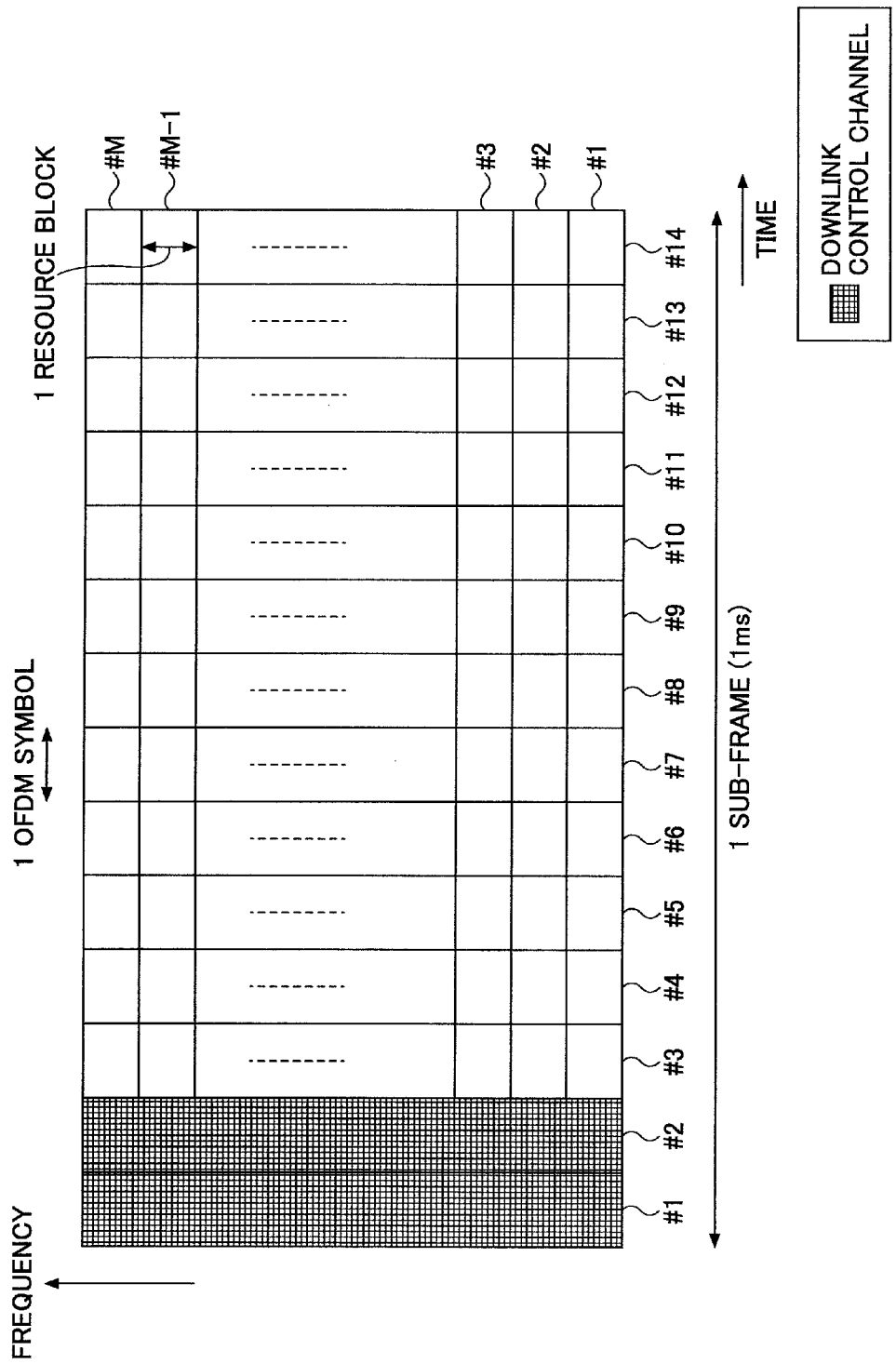
FIG. 2 is an explanatory view illustrating a sub-frame configuration.

In downlink transmission, one sub-frame is 1 ms long, for example, and there are fourteen OFDM symbols in one sub-frame as shown in FIG. 2. In FIG. 2, numbers (#1, #2, #3, ..., #14) in a time axis direction are numbers for identifying the OFDM symbols, and numbers (#1, #2, #3, ..., #M−1, #M; M is an integer more than 0) in a frequency axis direction are numbers for identifying resource blocks.

In some beginning OFDM symbols of one sub-frame, the downlink control channels for LTE are mapped. In FIG. 2, the downlink control channels for LTE are mapped to two beginning OFDM symbols of one sub-frame. In the OFDM symbols other than the OFDM symbols to which the downlink control channels for LTE are mapped, the normal data signal, the SCH, the BCH, and the data signal to which the transmission power control is applied are transmitted. In addition, M resource blocks are defined in the frequency direction. A frequency bandwidth per resource block is 180 kHz, for example, and there are twelve sub-carriers in one resource block. The number M of the resource blocks is 25 when a system bandwidth is 5 MHz, 50 when the system bandwidth is 10 MHz, or 100 when the system bandwidth is 20 MHz.

Figure 3:
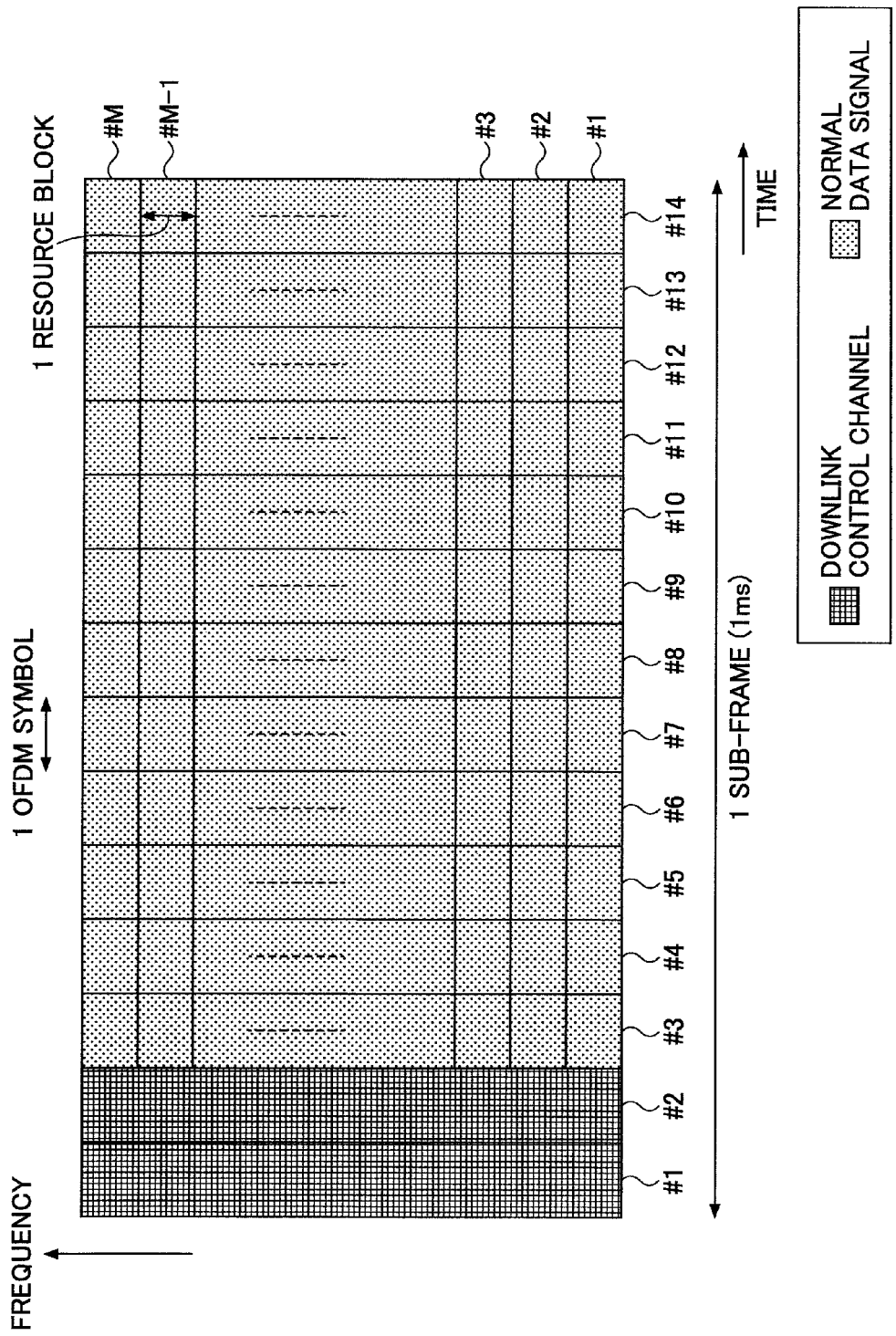
FIG. 3 is an explanatory view illustrating a case where only a normal data signal is transmitted in one sub-frame.

FIG. 3 illustrates a case where only the normal data signals are transmitted by one sub-frame. In FIG. 3, numbers (#1, #2, #3, ..., #14) in the time axis direction are numbers for identifying the OFDM symbols, and numbers (#1, #2, #3, ..., #M−1, #M, M is an integer more than 0) in the frequency axis direction are numbers for identifying resource blocks. In FIG. 3, the downlink control channels for LTE are mapped in the two beginning OFDM symbols of one sub-frame. In this case, only the normal data signals are transmitted by the resource blocks of the OFDM symbols #3 through #14.

Figure 4:
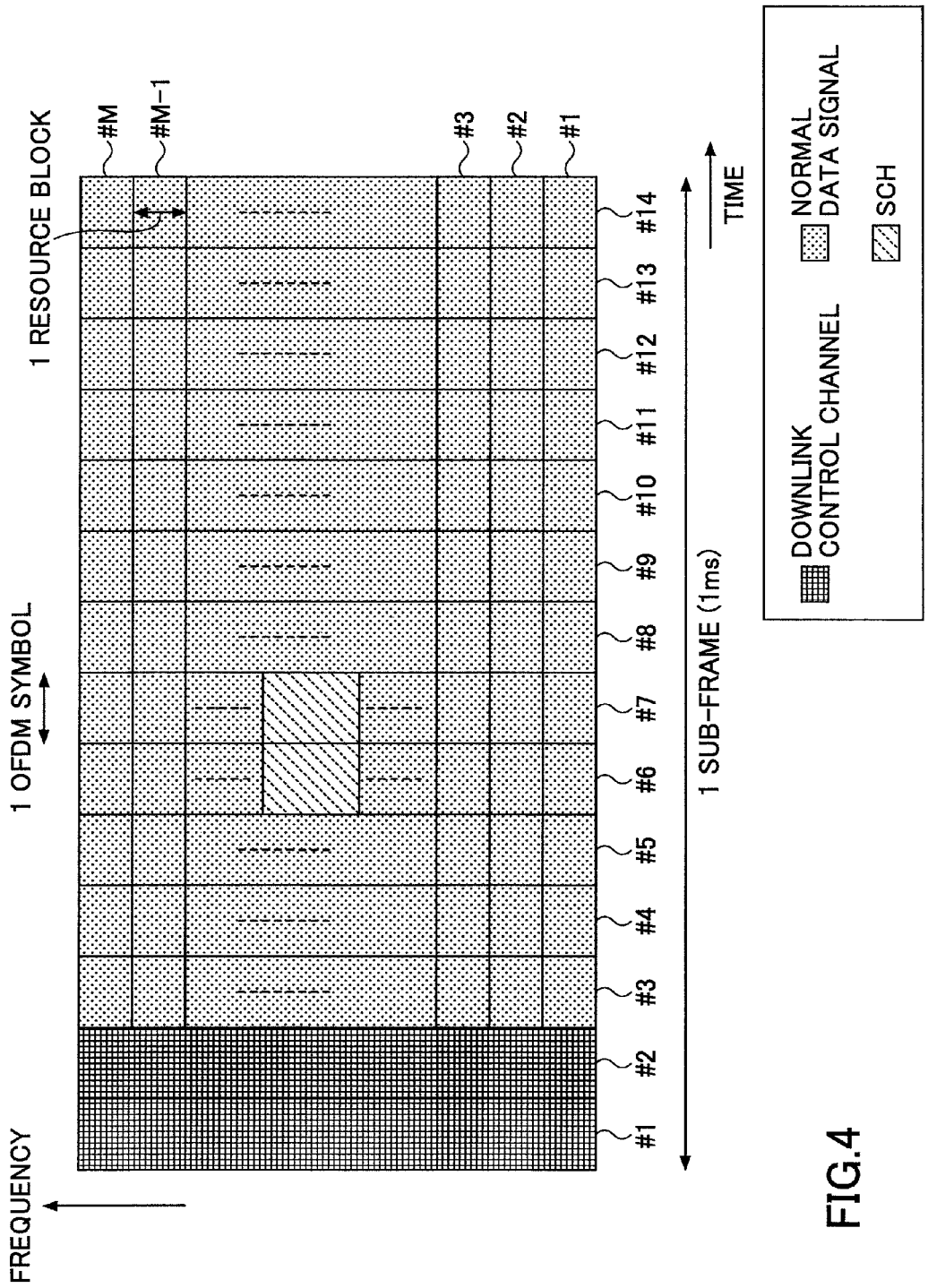
FIG. 4 is an explanatory view illustrating a case where an SCH as well as the normal data signal are transmitted in one sub-frame.

FIG. 4 illustrates a case where the SCHs in addition to the normal data signals are transmitted in one sub-frame. In FIG. 4, numbers (#1, #2, #3, ..., #14) in the time axis direction are numbers for identifying the OFDM symbols, and numbers (#1, #2, #3, ..., #M−1, #M, M is an integer more than 0) in the frequency axis direction are numbers for identifying resource blocks. In FIG. 4, the downlink control channels for LTE are mapped to the two beginning OFDM symbols of one sub-frame. In this case, the SCHs are transmitted by six center resource blocks in the OFDM symbols #6, #7, and the normal data signals are transmitted by areas other than the areas by which the downlink control channels for LTE and the area by which the SCHs are transmitted.

Figure 5:
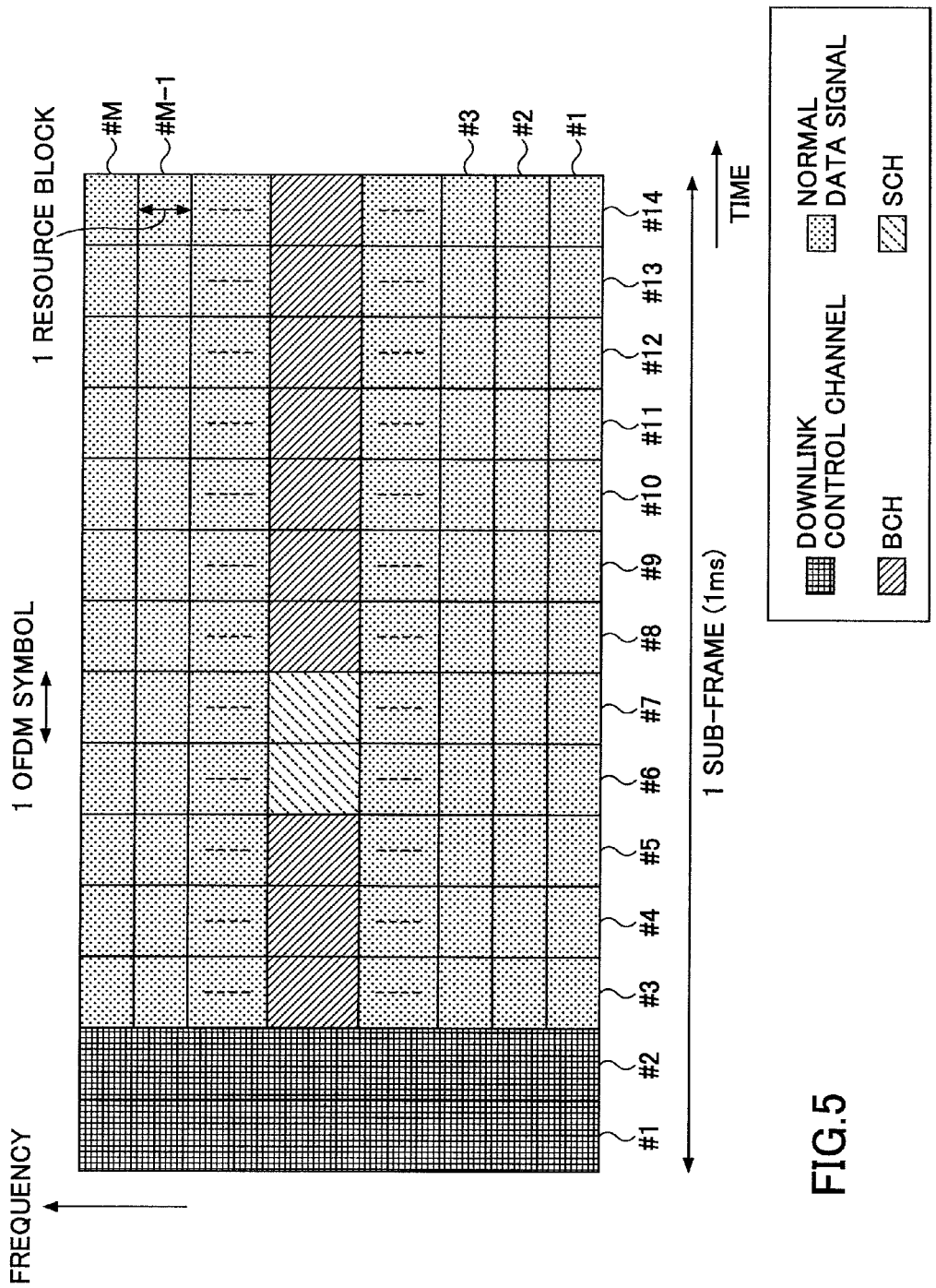
FIG. 5 is an explanatory view illustrating a case where a BCH and the SCH as well as the normal data signal are transmitted in one sub-frame.

FIG. 5 illustrates a case where the SCHs and the BCHs in addition to the normal data signals are transmitted in one sub-frame. In FIG. 5, numbers (#1, #2, #3, ..., #14) in the time axis direction are numbers for identifying the OFDM symbols, and numbers (#1, #2, #3, ..., #M−1, #M, M is an integer more than 0) in the frequency axis direction are numbers for identifying resource blocks. In FIG. 5, the downlink control channels for LTE are mapped to the two beginning OFDM symbols of one sub-frame. In this case, the SCHs are transmitted by the central six resource blocks in the OFDM symbols #6, #7, and the BCHs are transmitted by the central six resource blocks in the OFDM symbols #3 through #5 and #8 through #14. In addition, the normal data signals are transmitted in areas other than the areas by which the downlink control channels are transmitted and the areas by which the SCHs and the BCHs are transmitted. The BCHs in FIG. 5 mean Primary BCHs or Physical BCHs.

Figure 6:
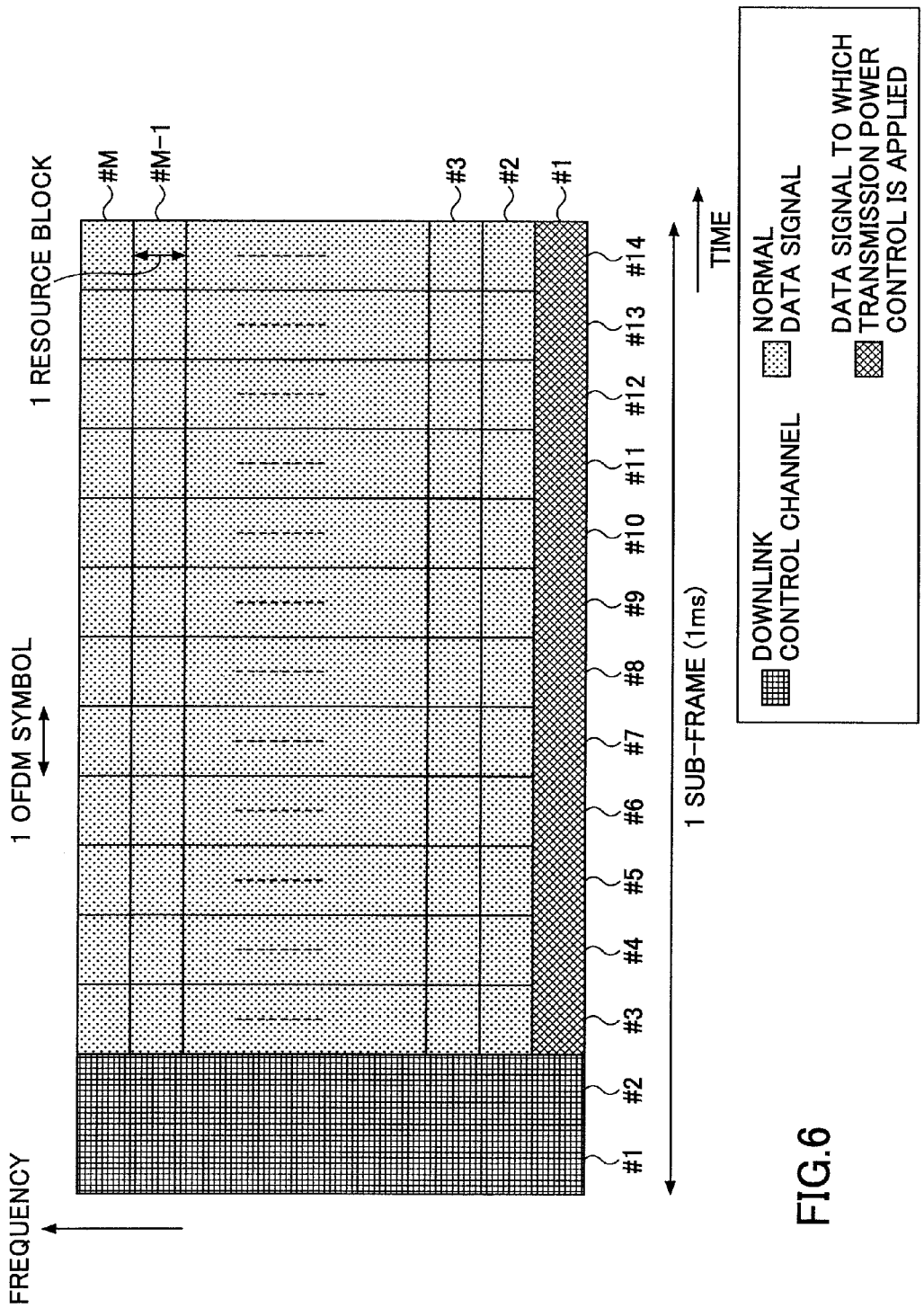
FIG. 6 is an explanatory view for illustrating a case where a data signal to which transmission power control is applied is transmitted in addition to a normal data signal by one sub-frame.

FIG. 6 illustrates a case where the data signals to which the transmission power control, in addition to the normal data signals, is applied are transmitted by one sub-frame. In FIG. 6, numbers (#1, #2, #3, ..., #14) in the time axis direction are numbers for identifying the OFDM symbols, and numbers (#1, #2, #3, ..., #M−1, #M, M is an integer more than 0) in the frequency axis direction are numbers for identifying resource blocks. In FIG. 6, the downlink control channels for LTE are mapped to the two beginning OFDM symbols of one sub-frame. In this case, the data signals to which the transmission power control is applied are transmitted by the resource block #1 in the OFDM symbols #3 through #14. The normal data signals are transmitted by areas other than the areas by which the downlink control channels are transmitted and the areas by which the data signals to which the transmission power control is applied are transmitted. In FIG. 6, although the data signals to which the transmission power control is applied are transmitted only by the resource block #1, they may be transmitted by two or more resource blocks.

Figure 7:
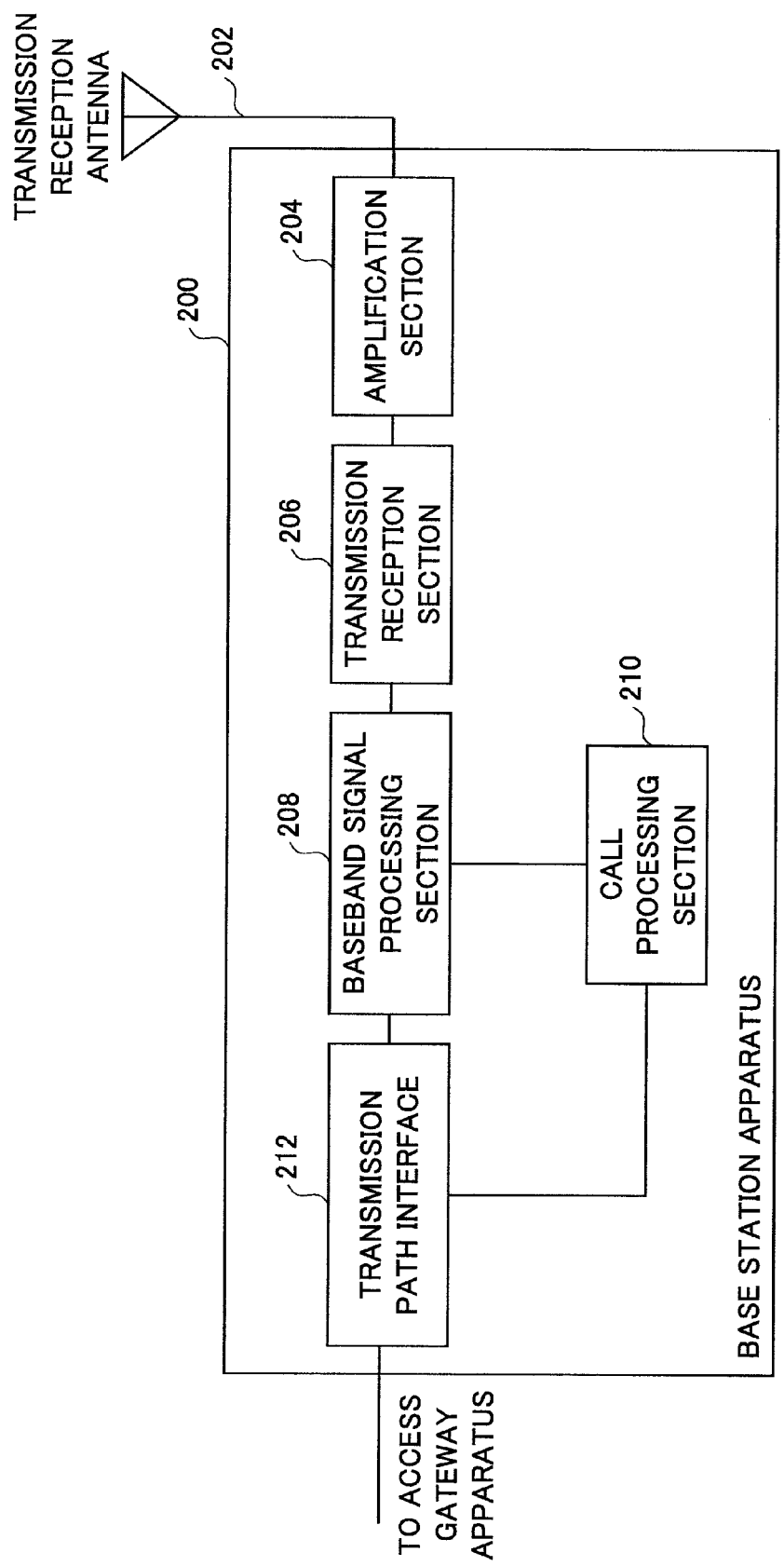
FIG. 7 is a partial block diagram illustrating a base station apparatus according to one example of the present invention.

Next, the base station apparatus 200 according to an example of the present invention is explained with reference to FIG. 7.

The base station apparatus 200 according to this example includes a transmission/reception antenna 202, an amplification section 204, a transmission/reception section 206, a baseband signal processing section 208, a call processing section 210, and a transmission path interface 212.

Packet data transmitted from the base station apparatus 200 to the mobile station $100_n$ in downlink are input to the baseband signal processing section 208 from, for example, the access gateway apparatus 300 via the transmission path interface 212.

In the baseband signal processing section 208, the packet data undergoes segmentation/concatenation, Radio Link Control (RLC) layer transmission processing such as an RLC retransmission control, MAC retransmission control, transmission processing of, for example, Hybrid Automatic Repeat request (HARQ), scheduling, transmission format selection, channel coding, Inverse Fast Fourier Transform (IFFT) processing, and is forwarded to the transmission/reception section 206. In addition, the baseband signal processing section 208 determines the transmission power levels assigned to the data signals to which the transmission power control is applied, the BCHs, the SCHs, the normal data signals, the Downlink Reference Signal and the like per sub-frame, resource block, and OFDM symbol, as described later.

In the transmission/reception section 206, the baseband signal output from the baseband signal processing section 208 undergoes frequency conversion processing for converting to a radio frequency band, is amplified by the amplification section 204, and is transmitted from the transmission/reception antenna 202.

On the other hand, regarding data transmitted from the mobile station apparatus $100_n$ to the base station apparatus 200 in uplink, the radio frequency band signals received by the transmission/reception antenna 202 are amplified by the amplification section 204, frequency-converted into a baseband signal by the transmission/reception section 206, and input to the baseband signal processing section 208.

In the baseband signal processing section 208, the input baseband signal undergoes FFT processing, IDFT processing, error correction decoding, reception processing of the MAC retransmission control, reception processing of RLC layer, and is forwarded to the access gateway apparatus 300 via the transmission path interface 212.

The call processing section 210 carries out resource assignment and state management of the radio station 200.

Figure 8:
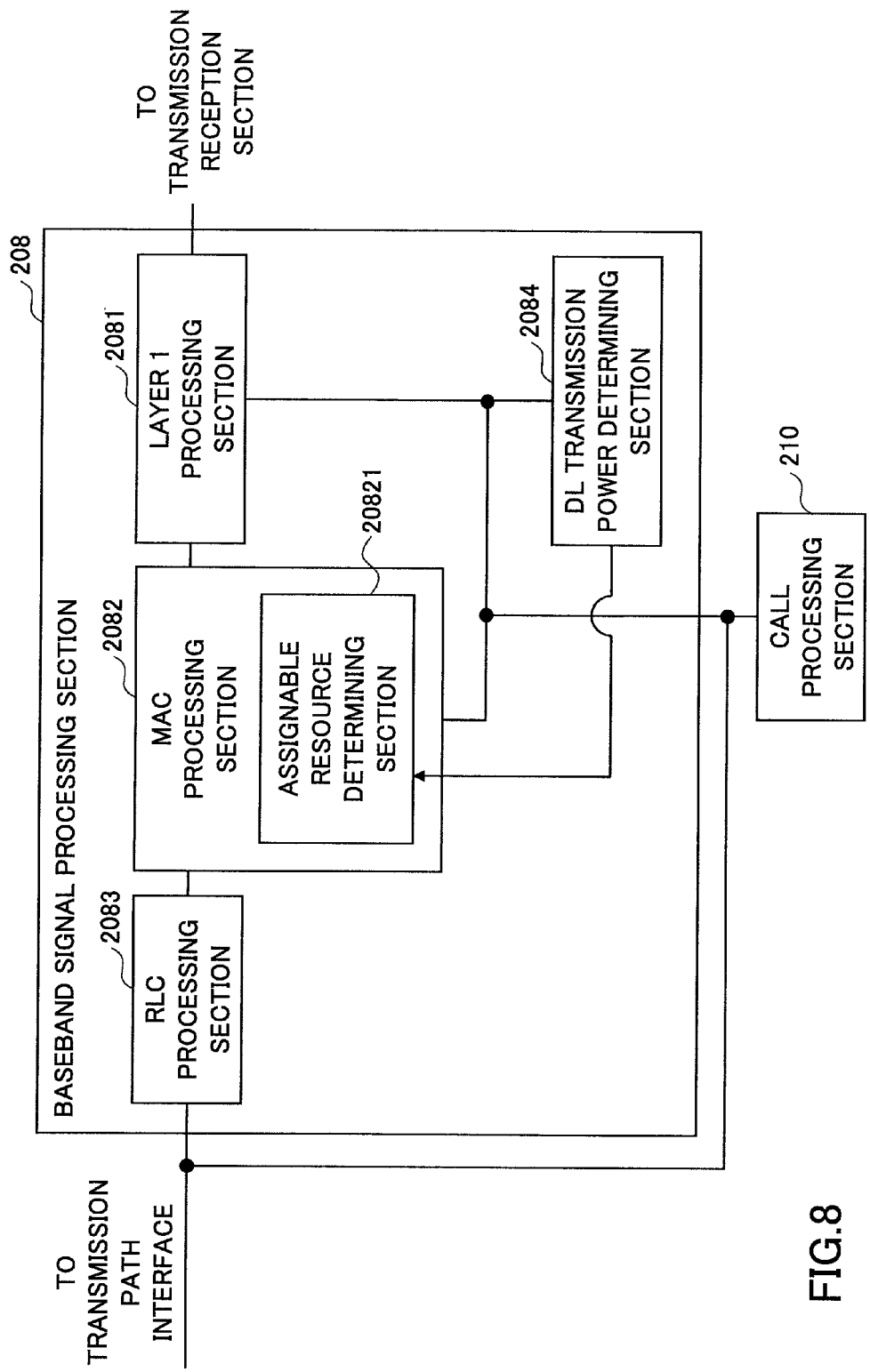
FIG. 8 is a block diagram illustrating a baseband section of the base station apparatus according to one example of the present invention.

Next, a configuration of the baseband signal processing section 208 is explained with reference to FIG. 8.

The baseband signal processing section 208 includes a layer 1 processing section 2081, a Medium Access Control (MAC) processing section 2082, an RLC processing section 2083, and a DL transmission power determining section 2084.

The layer 1 processing section 2081, the MAC processing section 2082, the RLC processing section 2083, and the DL transmission power determining section 2084 in the baseband signal processing section 208, and the call processing section 210 are connected with one another.

The layer 1 processing section 2081 carries out channel coding of the data transmitted in downlink, IFFT processing, channel decoding of the data transmitted in uplink, FFT processing and the like. In addition, the layer 1 processing section 2081 sets the transmission power levels of the sub-carriers to which the data signals where the transmission power control is applied, the BCHs, the SCHs, the normal data signals, the Downlink Reference Signals and the like are mapped, in accordance with the transmission power information provided from the DL transmission power determining section 2084.

The MAC processing section 2082 carries out the downlink data MAC retransmission control, transmission processing of, for example, the Hybrid Automatic Repeat reQuest (HARQ), scheduling, transmission format selection, frequency resource assignment and the like. Here, the scheduling means a process for selecting a mobile station apparatus to which the normal data signal is transmitted in the sub-frame using the shared channel. As an algorithm for the scheduling, there are round robin and proportional fairness, for example. In addition, the transmission format selection means that a modulation scheme, a coding rate, and a data size regarding the normal data signal to be transmitted to the mobile station selected by the scheduling are determined. The modulation scheme, the coding rate, and the data size are determined in accordance with, for example, the CQI provided in uplink from the mobile station apparatus $100_n$. Moreover, the frequency resource assignment means a process for determining a resource block to be used to transmit the normal data signal to be transmitted to the mobile station apparatus selected by the scheduling. The resource block is determined in accordance with, for example, the CQI provided in uplink from the mobile station apparatus.

In addition, the MAC processing section 2082 carries out the reception processing of MAC retransmission control, the scheduling, the transmission format selection, the frequency resource assignment and the like for uplink.

Moreover, an assignable resource determining section 20821 in the MAC processing section 2082 determines resource blocks assignable to the normal data signal, in accordance with the transmission power information provided from the DL transmission power determining section 2084. The MAC processing section 2082 carries out the scheduling, the transmission format selection, and the frequency resource assignment for the resource blocks assignable to the normal data signal.

For example, the assignable resource determining section 20821 in the MAC processing section 2082 receives the transmission power level $P_{BCH}$ of the BCH in the sub-frame, the transmission power level $P_{SCH}$ of the SCH in the sub-frame, the transmission power level $P_{data,TPC}$ of the data signal to which the transmission power control is applied in the sub-frame, the transmission power level $P_{data}^{(unit)}$ of the normal data signal per sub-carrier, and the maximum transmission power level $P_{total}$ of the base station apparatus 200 as the transmission power information from the DL transmission power determining section 2084, and calculates the number $Num_{RB}^{(data)}$ of the resource blocks assignable to the normal data signal using the following expression (1).

$$Num_{RB}^{(data)} = \left\lfloor \frac{P_{total} - P_{BCH} - P_{SCH} - P_{data,TPC}}{12 \times P_{data}^{(unit)}} \right\rfloor \quad (1)$$

"12" in the expression (1) is the number of sub-carriers in one resource block. In addition, the following notation (2) means that a number inside the notation is rounded down to an integer (or fractions are omitted).

$$\lfloor \rfloor \quad (2)$$

The above calculation is carried out with $P_{BCH}=0$ and $P_{SCH}=0$ in the sub-frames by which the SCH and the BCH are not transmitted. In addition, when there are plural data signals to which the transmission power control is applied, the $P_{data,TPC}$ is a total of the transmission power levels of all the data signals to which the transmission power control is applied. When the $NUM_{RB}^{(data)}$ becomes greater than M, the $NUM_{RB}^{(data)}$ is made equal to M.

Alternatively, when both the SCH and the BCH are transmitted in the sub-frame and by the same resource block (for example, FIG. 5), the number $NUM_{RB}^{(data)}$ of the resource blocks assignable to the normal data signal may be calculated using the following expression (3), because only a higher one of the transmission power of the SCH and the transmission power of the BCH may be considered. Here, max(x, y) is a function that returns a larger value of x and y.

$$Num_{RB}^{(data)} = \left\lfloor \frac{P_{total} - \max(P_{BCH}, P_{SCH}) - P_{data,TPC}}{12 \times P_{data}^{(unit)}} \right\rfloor \quad (3)$$

In the above example, while the SCH, the BCH, the data signal to which the transmission power control is applied, and the normal data signal are exemplified as channels transmitted in the sub-frame, the number of the resource blocks assignable to the normal data signal can be calculated in the same manner when the other channels are transmitted.

Figure 9:
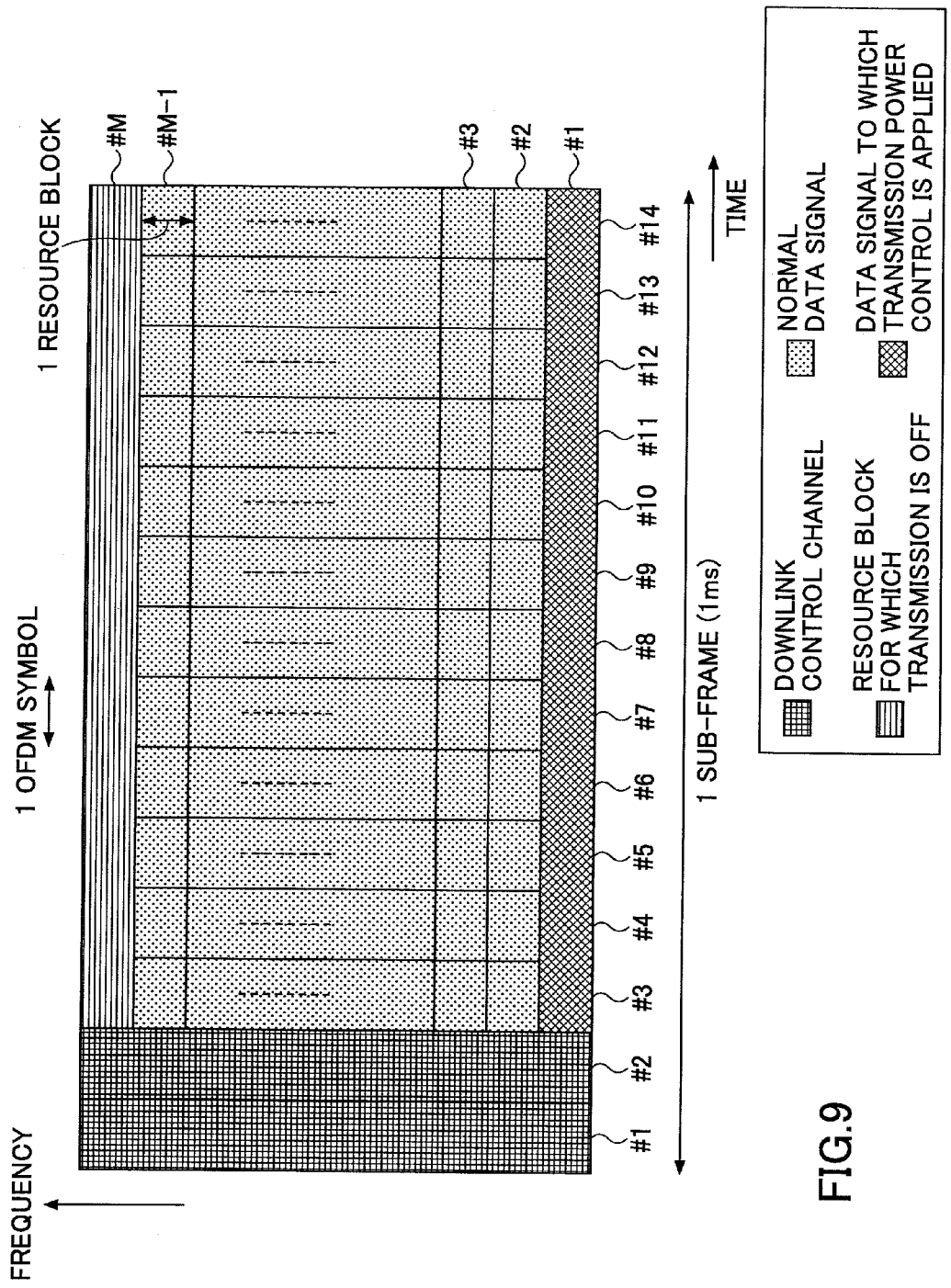
FIG. 9 is an explanatory view for illustrating a case where transmission is turned off at one resource block in the base station apparatus according to one example of the present invention.

For example, when the SCH, the BCH, the data signal to which the transmission power control is applied, a Dynamic BCH, a paging channel PCH, a random access channel response RACH response, a channel for MBMS, and the normal data signal are transmitted as the channel transmitted in the sub-frame, the number $NUM_{RB}^{(data)}$ of the resource blocks assignable to the normal data signal may be calculated using the following expression (4).

$$Num_{RB}^{(data)} = \left\lfloor \frac{P_{total} - \max(P_{BCH}, P_{SCH}) - P_{data,TPC} - P_{D-BCH} - P_{PCH} - P_{RACHres} - P_{MBMS}}{12 \times P_{data}^{(unit)}} \right\rfloor \quad (4)$$

where, $P_{D-BCH}$: transmission power of the Dynamic BCH in the sub-frame $P_{PCH}$: transmission power of the PCH in the sub-frame $P_{RACHres}$: transmission power of the RACH response $P_{MBMS}$: transmission power of the channel for MBMS in the sub-frame Referring to FIG. 9, a more specific example is explained. FIG. 9 illustrates that transmission is turned off in one resource block in an example of the present invention. In FIG. 9, numbers (#1, #2, #3, . . . , #14) in a time axis direction are numbers for identifying the OFDM symbols, and numbers (#1, #2, #3, . . . , #M−1, #M; M is an integer more than 0) in a frequency axis direction are numbers for identifying resource blocks. In FIG. 9, the downlink control channels for LTE are mapped to two beginning OFDM symbols of one sub-frame. In FIG. 9, the data signals to which the transmission power control is applied are transmitted by the resource block #1 in the OFDM symbols #3 through #14, and the normal data signals are transmitted by areas other than the areas by which the downlink control channels for LTE are transmitted and the areas by which the data signals to which the transmission power control is applied are transmitted. At this time, $P_{SCH}$ is equal to 0 and $P_{BCH}$ is equal to 0. In addition, the number $NUM_{RB}^{(data)}$ is calculated to be M−2 when $P_{data,TPC}=24 \times P_{data}^{(unit)}$, and $P_{total}=12 \times M \times P_{data}^{(unit)}$. At this time, the assignable resource determining section 20821 in the MAC processing section 2082 determines the resource blocks to be used to transmit the normal data signal to be the resource blocks #2 through #M−1, and turns off (or does not transmit) the resource block #M. Namely, the assignable resource determining section 20821 in the MAC processing section 2082 decreases the frequency resources (the number of resource blocks) to be assigned to the normal data signals when the transmission power of the data signals to which the transmission power control is applied is high, in order to keep the transmission power of the normal data signal constant.

For example, the assignable resource determining section 20821 in the MAC processing section 2082 determines the frequency resources to be assigned to the normal data signal such that the frequency resources to be assigned to the normal data signal are decreased as the transmission power of the data signal to which the transmission power control is applied is increased.

In the above example, the resource block where the transmission is turned off is determined to be the resource block #M, but may be determined to be other resource blocks.

The RLC processing section 2083 carries out RLC layer transmission processing regarding the downlink packet data such as segmentation/concatenation, transmission processing of the RLC retransmission control and the like, and RLC layer reception processing regarding the uplink data such as segmentation/concatenation, the RLC retransmission control, and the like.

The DL transmission power determining section 2084 determines the transmission power levels of the Downlink Reference Signal, the normal data signal, the SCH, the BCH, the data signal to which the transmission power control is applied and the like, and provides the determined transmission power levels of the Downlink Reference Signal, the normal data signal, the SCH, the BCH, the data signal to which the transmission power control is applied and the like to the layer 1 processing section 2081, the MAC processing section 2082, and especially, the assignable resource determining section 20821 in the MAC processing section 2082. Here, the transmission power values of the Downlink Reference Signal, the SCH, and the BCH are generally fixed values and determined in reference to a value signaled from the upper layer, or a value set as an internal parameter in the base station apparatus 200. In addition, the transmission power of the data signal to which the transmission power control is applied is determined in accordance with, for example, the CQI value provided from the mobile station. Moreover, the transmission power per sub-carrier of the normal data signal may be set as, for example, the transmission power per sub-carrier when the transmission power is evenly assigned to all the sub-carriers in the system bandwidth. For example, when the number of the sub-carriers in the system bandwidth is 300, and the maximum transmission power of the base station apparatus 200 is 20 W, the transmission power $P_{data}^{(unit)}$ is calculated using the following expression.

$$P_{data}^{(unit)} = 20/300 = 0.066666 \text{ (W)}$$

The transmission power value in the transmission power information may be the transmission power per sub-carrier, or a total transmission power of the sub-carriers to which the channel is mapped.

In addition, the DL transmission power determining section 2084 may provide the layer 1 processing section 2081 and the MAC processing section 2082 with the maximum transmission power (rated power) of the base station apparatus 200 as part of the transmission power information.

Next, a communications control method in the base station apparatus 200 according to this example is explained with reference to FIG. 10.

The DL transmission power determining section 2084 obtains the maximum transmission power of the base station apparatus 200, namely the rated power $P_{total}$ (step S1002).

The DL transmission power determining section 2084 obtains the transmission power per sub-carrier of the normal data signal $P_{data}^{(unit)}$ (step S1004). Here, the transmission power per sub-carrier of the normal data signal may be the transmission power per sub-carrier when the transmission power is evenly assigned to all the sub-carriers in the system bandwidth.

The DL transmission power determining section 2085 determines the transmission power $P_{BCH}$ of the BCH, the transmission power $P_{SCH}$ of the SCH, and the transmission power $P_{data,TPC}$ of the data signal to which the transmission power control is applied (step S1006). Here, the transmission power of the data signal to which the transmission power control is applied is determined in accordance with, for example, the CQI value provided from the mobile station.

The assignable resource determining section 20821 in the MAC processing section 2082 determines resource blocks assignable to the normal data signal (step S1008). Here, the number $NUM_{RB}^{(data)}$ of the resource blocks assignable to the normal data signal is calculated using the following expression (5).

$$Num_{RB}^{(data)} = \left\lfloor \frac{P_{total} - P_{BCH} - P_{SCH} - P_{data,TPC}}{12 \times P_{data}^{(unit)}} \right\rfloor \quad (5)$$

The MAC processing section 2082 carries out the scheduling, the transmission format selection, and the frequency resource assignment in the resource blocks assignable to the normal data signal (step S1010).

In the example described above, the normal data signal corresponds to a first signal, whereas the BCH, the SCH and the data signal to which the transmission power control is applied correspond to a second signal.

In addition, although the BCH, the SCH and the data signal to which the transmission power control is applied correspond to the second signal in the example described above, the PCH and the RACH response may correspond to the second signal, instead.

Moreover, the normal data signal may be a data signal to which Dynamic Scheduling is applied, and the data signal to which the transmission power control may be applied is a data signal to which Persistent Scheduling is applied.

When the Persistent Scheduling is applied, the transmission power control is carried out at predetermined periods, and changed when necessary (when the transmission power needs to be changed). Namely, the transmission power is changed in terms of time when necessary. Here, the data signal to which the Dynamic Scheduling is applied is a data signal to which normal scheduling, for example, the frequency scheduling is applied.

For example, the data signal is a downlink shared channel as a transport channel, and a dedicated traffic channel as a logical channel.

In addition, although the rated power is used as the maximum transmission power of the base station apparatus, but may be a fixed value smaller than the rated power, instead.

According to an example of the present invention, a base station apparatus and a communications control method that are capable of making constant transmission power per sub-carrier of the normal data signal, and utilizing the transmission power resources of the base station apparatus to a maximum even when there is a channel whose transmission power fluctuates with time.

The above example is explained taking an example of the system where Evolved UTRA and UTRAN (another name: Long Term Evolution, or Super 3G) is applied. However, the base station apparatus and the communications control method according to an example of the present invention are applicable to other systems employing Orthogonal Frequency Division Multiple Access in downlink.

While the present invention is described through the above examples, it should be understood that description and drawings as parts of this disclosure do not limit the present invention. Various alternative embodiments, examples and operational technologies are apparent to a person having ordinary skill in the art from the disclosure.

In other words, the present invention includes various other embodiments that are not described here. Therefore, the technical scope of the present invention should be understood by matters necessary to specify the invention according to the Claims in conjunction with the above examples.

While the present invention has been described separately as individual examples for simplicity of explanation, the individualities are not essential to the present invention, and one or more of the examples may be practiced when necessary. In addition, while the present invention has been described by using specific values in order to facilitate the understanding of the present invention, those values are merely examples and various values may be used unless otherwise noted.

While the present invention has been explained with reference to specific examples, each example is merely illustrative and a person having ordinary skill will understand various alterations, modifications, substitutions, replacements and the like. While the apparatuses according to the examples of the present invention are explained in the form of the operational block diagrams for simplicity of explanation, such apparatuses may be realized by hardware, software or a combination thereof. The present invention is not limited to the above examples, but includes various alterations, modifications, substitutions, replacements and the like without departing the scope of the present invention.

This international application claims the benefit of the priority date of Japanese Patent Application No. 2007-005196 filed on Jan. 12, 2007, and the entire content of Japanese Patent Application No. 2007-005196 is herein incorporated hereby by reference.

INDUSTRIAL APPLICABILITY

A mobile communications system, a base station, a mobile station, and a communications control method according to embodiments of the present invention are applicable to a radio communications system.

The invention claimed is:

1. A base station apparatus for carrying out communications with a mobile station in downlink using an OFDM method, the base station apparatus being characterized in that:
    the base station apparatus transmits a first signal and a second signal;
    a predetermined transmission power of the second signal is set; and
    the base station apparatus comprises
    a first transmission power controlling section that controls so that a transmission power per unit frequency band of the first signal is constant; and
    a frequency resource assignment section that determines a frequency resource to be assigned to the first signal, in accordance with the transmission power of the second signal and the transmission power per unit frequency band of the first signal.

2. The base station apparatus as claimed in claim 1, characterized in that the frequency resource assignment section determines the frequency resource to be assigned to the first signal so that the frequency resource to be assigned to the first signal is reduced as the transmission power of the second signal is increased.

3. The base station apparatus as claimed in claim 2, characterized in that:
    the first signal is a channel to which dynamic scheduling is applied;
    the second signal is at least one of a broadcast channel, a synchronization channel, a channel to which persistent scheduling is applied, and a channel for MBMS.

4. The base station apparatus as claimed in claim 1, characterized in that the first transmission power controlling section makes the transmission power per unit frequency band of the first signal a transmission power per unit frequency band obtained when a transmission power is evenly assigned to all of a frequency band.

5. The base station apparatus as claimed in claim 4, characterized in that:
    the first signal is a channel to which dynamic scheduling is applied;
    the second signal is at least one of a broadcast channel, a synchronization channel, a channel to which persistent scheduling is applied, and a channel for MBMS.

6. The base station apparatus as claimed in claim 1, characterized in that the frequency resource assignment section determines the frequency resource to be assigned to the first signal, in accordance with a maximum transmission power of the base station apparatus in addition to the transmission power of the second signal and the transmission power per unit frequency band of the first signal.

7. The base station apparatus as claimed in claim 6, characterized in that the frequency resource assignment section determines a frequency resource $BW_1$ to be assigned to the first signal in accordance with:

$$BW_1 = (P_{total} - P_2)/P_1^{(unit)}$$

wherein,
    $P_1^{(unit)}$ is the transmission power per unit frequency band of the first signal,
    $P_2$ is the transmission power of the second signal, and
    $P_{total}$ is a total transmission power.

8. The base station apparatus as claimed in claim 7, characterized in that:
    the first signal is a channel to which dynamic scheduling is applied;
    the second signal is at least one of a broadcast channel, a synchronization channel, a channel to which persistent scheduling is applied, and a channel for MBMS.

9. The base station apparatus as claimed in claim 6, characterized in that:
    the first signal is a channel to which dynamic scheduling is applied;
    the second signal is at least one of a broadcast channel, a synchronization channel, a channel to which persistent scheduling is applied, and a channel for MBMS.

10. The base station apparatus as claimed in claim 1, characterized in that:
    the first signal is a channel to which dynamic scheduling is applied;
    the second signal is at least one of a broadcast channel, a synchronization channel, a channel to which persistent scheduling is applied, and a channel for MBMS.

11. A base station apparatus for carrying out communications with a mobile station in downlink using an OFDM method, the base station apparatus being characterized in that:
    the base station apparatus transmits a first signal and a second signal; and
    the base station apparatus comprises
    a first transmission power controlling section that controls so that a transmission power per unit frequency band of the first signal is constant,
    a second transmission power controlling section that changes a transmission power of the second signal in terms of time, and
    a frequency resource assignment section that determines a frequency resource to be assigned to the first signal, in accordance with the transmission power of the second signal and the transmission power per unit frequency band of the first signal.

12. The base station apparatus as claimed in claim 11, characterized in that the frequency resource assignment section determines the frequency resource to be assigned to the first signal so that the frequency resource to be assigned to the first signal is reduced as the transmission power of the second signal is increased.

13. The base station apparatus as claimed in claim 11, characterized in that the first transmission power controlling section makes the transmission power per unit frequency band of the first signal a transmission power per unit frequency band obtained when a transmission power is evenly assigned to all of a frequency band.

14. The base station apparatus as claimed in claim 11, characterized in that the frequency resource assignment section determines the frequency resource to be assigned to the first signal, in accordance with a maximum transmission power of the base station apparatus in addition to the transmission power of the second signal and the transmission power per unit frequency band of the first signal.

15. The base station apparatus as claimed in claim 11, characterized in that:
    the first signal is a channel to which dynamic scheduling is applied;
    the second signal is at least one of a broadcast channel, a synchronization channel, a channel to which persistent scheduling is applied, and a channel for MBMS.

16. A communications control method in a base station apparatus for carrying out communications with a mobile station in downlink using an OFDM method, the communications control method being characterized in that:

the base station apparatus transmits a first signal and a second signal, and the communications control method comprises a transmission power setting step, wherein a predetermined transmission power of the second signal is set;

a first transmission power controlling step, wherein the transmission power per unit frequency band of the first signal is controlled to be constant; and a frequency resource assigning step, wherein the frequency resource to be assigned to the first signal is determined in accordance with the transmission power of the second signal and the transmission power per unit frequency band of the first signal.

\* \* \* \* \*